UNITED STATES PATENT OFFICE.

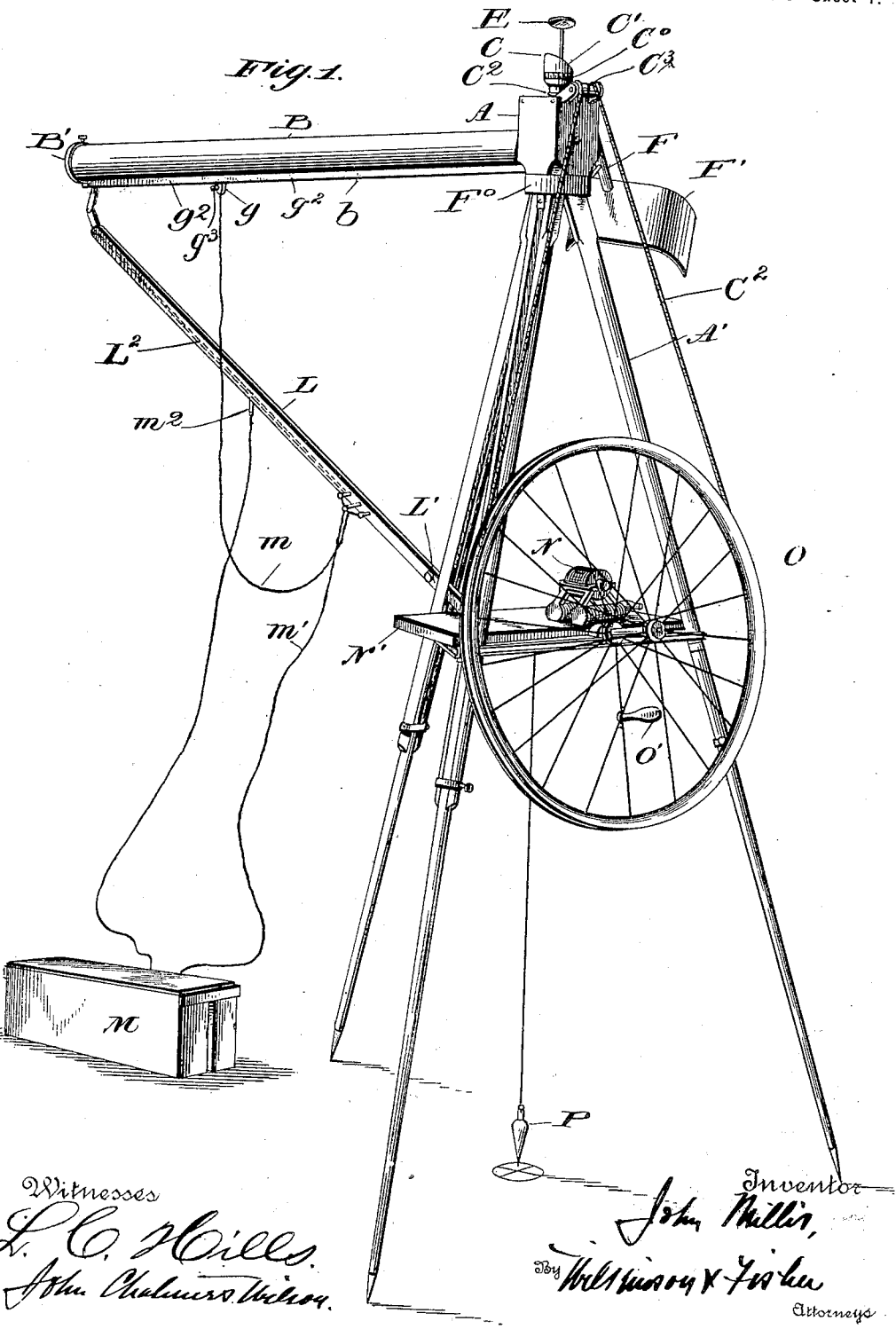

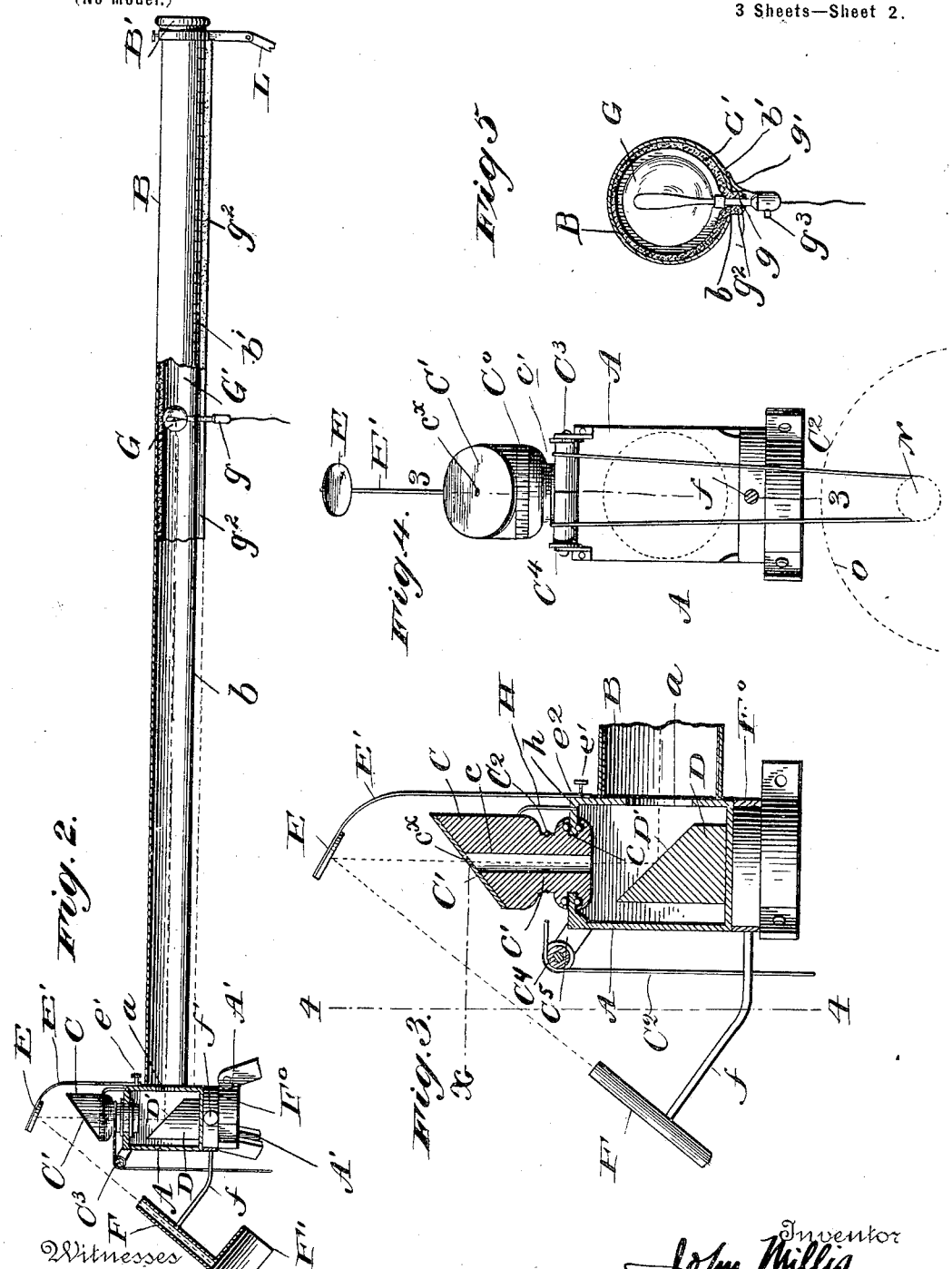

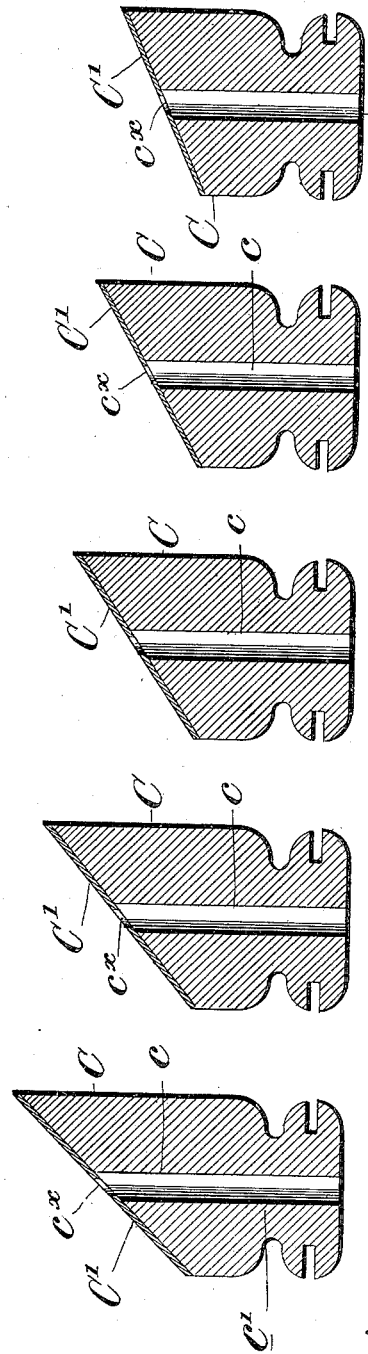

JOHN MILLIS, OF THE UNITED STATES ARMY.

PHOTOMETER.

SPECIFICATION forming part of Letters Patent No. 652,680, dated June 26, 1900.

Application filed August 7, 1899. Serial No. 726,448. (No model.)

*To all whom it may concern:*

Be it known that I, JOHN MILLIS, captain in the United States Army, stationed at Willets Point, in the State of New York, have invented certain new and useful Improvements in Photometers; and I do hereby declare the following to be a full, clear, and exact description of the invention, such as will enable others skilled in the art to which it appertains to make and use the same.

My invention relates to improvements in photometers, designed more especially to measure general illumination or "diffused" light, although it is also well adapted to the direct measurement of the luminous intensity or candle-power of lamps and other sources of light. It is adapted to the measurement of either daylight or artificial light.

The practical forms of photometers heretofore generally used involve the principle of comparison between two surfaces, one illuminated by the light to be measured and the other by a standard light of known intensity. Such instruments work well for direct measurement of the candle-power of a light source, such as a lamp; but in the forms heretofore used they present certain difficulties when applied to the measurement of general illumination. For this purpose the surface intended to be illuminated only by the standard source must be effectively screened from other light, and the other surface must be fully exposed to the diffused light. Obstruction of the diffused light by any part of the instrument or by the observer's body must be avoided. Attempts have been made to meet these conditions by instruments which depend on the principle of comparing the light after transmission through a semitransparent screen, like ground glass; but the objections to such instruments, as compared to those in which opaque surfaces directly illuminated are compared, are obvious. By transmission through such screens the intensity of the light is modified and its quality may also be changed, and account must be taken of these effects in using such instruments. It seems to have been assumed heretofore that the two illuminated surfaces compared must be adjacent or very near to each other in photometric instruments, or at least that if one is projected against the other the distance between them must be very small. I have found, however, that if one illuminated surface is seen through an orifice in the other the distance between the surfaces may be made considerable, at least several inches, without affecting the accuracy of the comparison. This has been fully confirmed by experiment and test, and by applying it in the hereinafter-described instrument the objections above referred to are removed.

My invention will be understood by reference to the accompanying drawings, wherein the same parts are indicated by the same letters throughout the several views.

Figure 1 represents a perspective view of an apparatus embodying my invention. Fig. 2 is a view, partly in section and partly in side elevation, of the upper part of the instrument wherein the rays of light are projected. Fig. 3 is an enlarged sectional view showing in detail the upper part of the instrument seen to the left in Fig. 2, the section being taken on the line 3 3 in Fig. 4. Fig. 4 is an elevation of the upper portion of the instrument looking to the right in Figs. 2 and 3, partly in section on the line 4 4 in Fig. 3. Fig. 5 is a cross-sectional view through the lamp-tube seen in Fig. 2. Fig. 6 represents a series of interchangeable rotatable blocks or cylinders such as might be used with my instrument, illustrating the possible variation in inclination which may be given to the inclined surfaces thereof, the blocks being shown in section.

In measuring the general illumination at any point, as in a certain locality in a room, a large number of measurements would have to be made if it were desired to take account of the light that the walls and ceiling of the room radiate or reflect to that point, as well as of the light that reaches it directly from lamps or other artificial sources. In case of daylight coming from windows and greatly diffused, a still larger number of observations in different directions might have to be taken to get the mean result. Such measurements would be extremely tedious, and if the mean of the observations were taken the result would be only approximate, since light coming from all directions is not ordinarily of equal value or "weight," so that the simple average of a great number of direct measurements might be misleading.

If a plain light-diffusing surface is mounted so that it may be revolved about a vertical axis and given any desired inclination with respect to that axis, it will ordinarily vary in illumination or brightness as its position is changed, owing to the variation in the intensity of light that reaches it from various directions. If revolved about its vertical axis with moderate speed, it appears to "flicker." If revolved rapidly, it appears of fixed and uniform tint. If it is now given such an angle of adjustment with respect to the vertical axis that proper relative weight is given to light coming from different directions, it may be revolved with sufficient speed to make it appear of fixed illumination and compared with the fixed surface illuminated by the standard lamp. By this means a measurement of the mean effective illumination is obtained with great facility, and the same instrument may be used to measure the illumination from any defined direction by observing the surface when at rest and properly adjusted and screened.

Referring to the accompanying drawings, A represents a closed box pivotally mounted upon a suitable support consisting of a tripod A'.

B represents a tube closed at its outer end B' and securely attached to one side of the box A, communicating with the interior of the said box through an opening $a$ therein.

C represents a cylindrical barrel with a central axial opening $c$ therethrough and a flat inclined upper surface C', the said inclined surface C' having a central opening $c^\times$ therethrough concentric with but smaller than the axial opening $c$, which extends through the barrel. This barrel C may be solid, as shown, or of any other suitable construction, and the inclined surface C' thereof may be made adjustable, if desired. The said barrel C has a hollow stem $c'$, which is rotatably mounted, as at $e$, in or upon the upper side of the box A, extending through the wall of the box into the interior thereof, as seen in Figs. 2 and 3. The stem $c'$ of the barrel C may be encircled by a cord $C^2$, reeved over rollers $C^3$ and $C^4$, mounted in brackets $C^5$ upon the box A, as shown, for rotating the said barrel by means of a hand wheel or motor, as hereinafter more fully described.

D represents a cylindrical block or other suitable body seated within the bottom of the box A and having a flat inclined upper surface D' so arranged that the axial opening $c$ in the barrel C and the smaller concentric opening $c^\times$ through the inclined surface C' at the upper end of said barrel C are above the approximate center of the said inclined surface D'. This inclined surface is also arranged opposite the opening $a$ in the side of the box A communicating with the lamp-tube B, hereinbefore referred to. The block D may be adjustable about its vertical axis, if desired. The inclination of the surface D' is not necessarily confined to a fixed angle of inclination, as the inclination of this surface may be varied as desired for accomplishing the best results.

E represents a small mirror, which is mounted upon a curved stem E' in such position that its center will be immediately over the opening $c^\times$ in the inclined surface C' and at an inclination to the horizontal. The stem E', supporting this mirror, is adjustably clamped upon the box A by means of a thumb-screw $e'$ and a suitable collar which permit of an adjustment about the vertical axis of the instrument.

F represents a sight-tube, provided with an eye-screen F' and supported upon an arm $f$, attached to an adjustable ring $F^0$, which encircles the head of the tripod and is secured thereto by means of a thumb-screw $f'$. The angle of the mirror E and the angle of the sight-tube F are so arranged that the upper surface C' of the barrel C and a portion of the upper surface D' of the block D, showing through the central opening $c^\times$ in the surface C' and the axial opening $c$ in the barrel C, are seen by reflection through the sight-tube F, the small reflected portion of the inclined surface D' of the block D appearing by reflection in the center of mirror E. The adjustable ring $F^0$, and with it the arm $f$, sight-tube F, and screen F', may be revolved about the vertical axis of the tripod-head for adjustment.

The barrel C has a graduated scale $C^0$ about its circumference, and a pointer H, fixed, as at $h$, upon the box A, indicates the position or azimuth of the barrel C when the latter is used in various fixed positions.

The outer end of the lamp-tube B is closed, as at B', and is supported by a suitable brace L, as shown clearly in Fig. 1, the lower end L' of the said brace being connected to one of the legs of the tripod A'.

Referring to Figs. 2 and 5, G represents a small incandescent electric lamp mounted on a carriage or slide G', which may be moved easily along the tube B, the stem $g$ of the lamp projecting through a longitudinal slot $b$ in the tube B and forming a handle by means of which the position of the lamp may be adjusted. Along one side of the slot $b$ in the tube B graduations are marked, as seen at $b'$ in Fig. 2, along which a pointer $g'$ on the lamp-stem moves and indicates to the operator the position of the lamp at any time. The interior of said tube B is provided with a lining of black felt G' in the form of a strip, which is curved to fit the interior contour of the tube B and has its longitudinal edges $g^2$ $g^2$ protruding through the slot $b$ in the said tube, as seen in Figs. 2 and 5. These protruding edges of the felt strip serve to close the slot $b$ against the passage of exterior light to the interior of the tube B and at the same time, by reason of the compressibility of the material, allow the lamp-stem to be moved along the slot at the will of the operator.

The lamp G is operated from any suitable source of electricity—as, for instance, a group of dry battery-cells contained in a box M, (seen in Fig. 1,) connected to the said lamp by insulated wires $m$ and $m'$—and a key or other contact device $g^3$ may be attached to the handle of the lamp-slide, so that the current is on only when the handle is grasped to make an adjustment, thus preventing the exhaustion of the battery or too-rapid deterioration of the lamp. A small ampere-meter (not shown) in circuit with the lamp and an adjustable resistance permits of adjustment of the current to a fixed value. The adjustable resistance consists of a bare German-silver wire, (indicated by dotted lines at $L^2$ in Fig. 1,) stretched along the brace L, and a movable contact $m^2$ in connection therewith, as seen in Fig. 1.

In Fig. 1 I have shown the cord $C^2$ as driven by a band-wheel O with a concave periphery, in which the cord runs and is mounted upon a suitable support upon the tripod, and the said band-wheel is provided with a handle O', by means of which the same may be turned; but I also provide a small electric motor N, mounted upon a platform N', held within the tripod A' and receiving its current from cells located within the box M, as this is preferable, although either the motor or the band-wheel may be used to rotate the barrel C. The plumb-bob P is used in setting up the instrument over the spot marked on the floor or other surface by which the tripod is set up.

It will be seen that by the separation of surfaces C' and D' a construction is entirely practicable which effectively protects the surface of D' from outside light, while allowing C' to be fully exposed and not shaded by the head of the observer or any part of the instrument. The mirror E is made as small as practicable, and its stem is made thin, so as not to obstruct the light to any appreciable degree. The mirror E prevents any outside light from above passing through the orifice in the barrel C and so falling on D', and the eye-screen of the sight-tube and the observer's head effectively cut off any light which otherwise would reach D' by reflection from the mirror E.

The tube B is lined with black felt, as described, and all interior surfaces except the inclined surface D' are made black. The surfaces C' and D' are made of some light diffusing material, like plaster-of-paris or chalk, or even dull paper.

For measuring artificial illumination it is generally preferable to use white surfaces for both C' and D', since most artificial light used for interior illumination can be closely matched in color by the light from the incandescent lamp used as a standard. For daylight measurements, however, I have found it preferable to use for C' a surface of an orange tint, D' remaining white. By this means a perfect "balance" and a reliable measure of the intensity of daylight may be obtained. I have also used a greenish-blue on D', C remaining white, and obtained fairly satisfactory results in daylight work.

In measuring sources of light of different color from that of the standard lamp in order to obtain the best results the tints for the surfaces C' and D' should be chosen with reference to the colors of the standard lamp and that of the source of light, respectively. The object to be thus attained is to so combine the tints of the surfaces illuminated with the color of their respective sources of illumination that when both of said surfaces are illuminated by their respective sources of illumination this combination of the tint of the surface and the color of the source of illumination will produce the effect of the same color on the two illuminated surfaces, so that when viewed by the operator the color will not have to be considered, but merely a comparison of the intensity made. The selection of appropriate combinations of tints for the illuminated surfaces may be facilitated by experiment, and a number of cylinders or blocks having the inclined surfaces of various tints may be provided for use as needed.

Not only may the angle of inclination of the surface D' be variable, but similarly also the angle of inclination of the surface C' may be variable. This might be accomplished by making these surfaces adjustable; but I prefer to provide interchangeable barrels or surfaces of different inclination or tint for use as occasion requires. The box A may be given an inclination to the vertical through suitable adjustment of one or more of the legs of the tripod, as desired, or in any other well-known way, to vary the position of the barrel C.

The instrument is made so that it may be conveniently folded up into a compact bundle for transportation.

In use the instrument is manipulated as follows: The points where it is desired to make observations are determined and marked, as by chalk, on the floor. The extension-legs of the tripod A' are adjusted to bring the surface C' at the desired height above the floor, and by means of the plumb-bob the instrument is placed in position. Connections are made with the battery, and the observer sits on a chair or stool in such position that he can conveniently reach the handle of the lamp with the right hand and look through the sight-tube. If the motor is used, he manipulates the switch with the left hand. If the hand-wheel is used, it is turned by an assistant, or the observer may turn it with his left hand. The current is adjusted by means of the variable resistance and the barrel C started revolving. The lamp G is then moved till a balance is obtained or until the surface C' and the portion of surface D' seen through the opening $c^\times$ appear of equal brightness and reading taken, the readings being repeated as often as may be desired. Should it be desired to measure the illumination in a number of fixed directions, the cord C² may be removed and the barrel C turned by hand successively to various positions, which are indicated by the graduations C⁰ and the pointer H. In either case the readings are reduced to the adopted unit, as "candle-feet" or "foot-candles," by measuring the candle-power of lamp G and by calculation in accordance with well-known principles of optics. In measuring daylight a barrel with surface C' tinted is put on and upon being rotated the comparison made as above described. To measure directly the candle-power of any light source, as a lamp, the lamp to be measured is placed so that the surface C' of the barrel C when at rest is illuminated by the lamp alone and the comparison made as described above. The result is then deduced by proper calculation. Thus in Fig. 1 the lamp to be measured may be placed in a direction X in the same horizontal plane as the center of C' and its candle-power calculated from the reading obtained when lamp G is adjusted to a balance.

For convenience of adjustment the box and tube may be revoluble about the vertical axis of the tripod.

It will be seen that the principle of my instrument permits of a very light, simple, and easily-portable construction and that the separation of surface C' and D' permits of effectively screening D' from external light, while surface C' is fully exposed to the light to be measured. The revolving inclined surface C' renders possible a very expeditious determination of the mean illumination at any point by a method which takes into account the relative practical value or weight of the light coming from different directions.

Having thus described my invention, what I claim, and desire to secure by Letters Patent of the United States, is—

1. In a photometer, the combination with a light-diffusing surface arranged to be illumined only by a source of light of known intensity; of a second light-diffusing surface adapted to be illumined by the source of light to be measured, set at an inclination and journaled to rotate about a vertical axis; means for rotating said surface; and a mirror reflecting portions of both of said surfaces, substantially as described.

2. In a photometer, the combination with a light-diffusing surface arranged to be illumined only by a source of light of known intensity; of a second light-diffusing surface adapted to be illumined by the source of light to be measured provided with an opening therethrough; and a mirror arranged to reflect both of said surfaces, the one being visible through the opening in the other, substantially as described.

3. In a photometer, the combination with a light-diffusing surface arranged to be illumined only by the source of light of known intensity; of a second light-diffusing surface adapted to be illumined by the source of light to be measured having an opening therethrough; a mirror arranged to reflect portions of both of said surfaces, and screening said first-named surface from direct rays entering through the opening in the said second surface; and a sight-tube arranged to give a view of the portions of the said surfaces that are reflected in said mirror, substantially as described.

4. In a photometer, the combination with a light-diffusing surface arranged to be illumined only by a source of light of known intensity; of a second light-diffusing surface adapted to be illumined by the source of light to be measured having an opening therethrough; a mirror arranged to reflect portions of both of said surfaces, and screening said first-named surface from direct rays entering through the opening in the said second surface; a sight-tube arranged to give a view of the face of said mirror; and an eye-screen upon said sight-tube arranged to screen said mirror from the rays of light which would enter by reflection through said opening, substantially as described.

5. In a photometer adapted to measure the mean effective illumination at a given point, the combination with an inclined plane surface rotatably mounted upon a vertical axis to allow the same to be continuously rotated with sufficient speed to appear of uniform brilliancy; of a mirror reflecting said inclined surface however the latter may be turned and means to rotate said inclined surface; substantially as described.

6. In a photometer adapted to measure the mean illumination at a given point, the combination with a light-diffusing surface arranged to be illumined only by a source of light of known intensity; of a second rotatable inclined surface adapted to be illumined by the light to be measured; and a mirror reflecting portions of both of said surfaces, substantially as described.

7. In a photometer adapted to measure the mean illumination at a given point, the combination with a light-diffusing surface arranged to be illumined only by a source of light of known intensity; of a second rotatable inclined surface adapted to be exposed to the light to be measured, provided with an axial opening therethrough; and a mirror arranged in line with the axis to reflect both of said surfaces the one being visible through the opening in the other, substantially as described.

8. In a photometer adapted to measure the mean illumination at a given point, the combination with a light-diffusing surface arranged to be illumined only by a source of light of known intensity; of a second rotatable inclined light-diffusing surface adapted to be exposed to the light to be measured, having an axial opening therethrough; a mirror located to reflect portions of both of said surfaces, and to screen said first-named surface from direct rays entering through the opening in the said second surface; and a sight-tube arranged to give a view of the portions of the said surfaces that are reflected in said mirror, substantially as described.

9. In a photometer adapted to measure the mean illumination at a given point, the combination with a light-diffusing surface arranged to be illumined only by a source of light of known intensity; of a second rotatable inclined light-diffusing surface exposed to the light to be measured, having an opening therethrough; a mirror located to reflect portions of both of said surfaces, and to screen said first-named surface from direct rays entering through the opening in the said second surface; a sight-tube arranged to give a view of the face of said mirror; and an eye-screen upon said sight-tube arranged to screen said mirror from rays of light which would enter by reflection through said opening, substantially as described.

In testimony whereof I affix my signature in presence of two witnesses.

JOHN MILLIS.

Witnesses:
CHAS. CLYDE WALL,
WM. PABST.